United States Patent
Zhao et al.

(10) Patent No.: US 11,331,890 B1
(45) Date of Patent: May 17, 2022

(54) POLYMERIC SANDWICH STRUCTURE HAVING ENHANCED THERMAL CONDUCTIVITY AND METHOD OF MANUFACTURING THE SAME

(71) Applicant: GM GLOBAL TECHNOLOGY OPERATIONS LLC, Detroit, MI (US)

(72) Inventors: Selina X. Zhao, Rochester Hills, MI (US); Xiaosong Huang, Novi, MI (US)

(73) Assignee: GM Global Technology Operations LLC, Detroit, MI (US)

(\*) Notice: Subject to any disclaimer, the term of this patent is extended or adjusted under 35 U.S.C. 154(b) by 0 days.

(21) Appl. No.: 17/130,566

(22) Filed: Dec. 22, 2020

(51) Int. Cl.
*B32B 27/12* (2006.01)
*B32B 27/20* (2006.01)
(Continued)

(52) U.S. Cl.
CPC .............. *B32B 27/12* (2013.01); *B32B 3/266* (2013.01); *B32B 5/02* (2013.01); *B32B 27/20* (2013.01); *B32B 37/06* (2013.01); *B32B 38/04* (2013.01); *B32B 2038/047* (2013.01); *B32B 2250/04* (2013.01); *B32B 2260/021* (2013.01); *B32B 2260/046* (2013.01); *B32B 2262/0269* (2013.01); *B32B 2262/101* (2013.01); *B32B 2262/106* (2013.01); *B32B 2264/101* (2013.01); *B32B 2264/108* (2013.01); *B32B 2264/201* (2020.08); *B32B 2264/2032* (2020.08); *B32B 2307/302* (2013.01)

(58) Field of Classification Search
CPC ........... B32B 27/12; B32B 3/266; B32B 5/02; B32B 27/20; B32B 37/06; B32B 38/04; B32B 2038/047; B32B 2250/04; B32B 2264/2032; B32B 2307/302
See application file for complete search history.

(56) References Cited

U.S. PATENT DOCUMENTS

| | | | |
|---|---|---|---|
| 9,896,783 B2 | 2/2018 | Kia | |
| 10,113,250 B2 | 10/2018 | Kia | |

(Continued)

OTHER PUBLICATIONS

Selina X. Zhao, Xiaosong Huang, "Class-A Components Comprising Moldable Carbon Fiber", U.S. Appl. No. 16/703,931, filed Dec. 5, 2019, 24 pages.
(Continued)

*Primary Examiner* — Lawrence D Ferguson
(74) *Attorney, Agent, or Firm* — Quinn IP Law

(57) ABSTRACT

A polymeric sandwich structure having enhanced thermal conductivity includes a first layer formed from a first polymer matrix and including a first fiber reinforcing sheet embedded within the first polymer matrix, a second layer formed from a second polymer matrix and including a second fiber reinforcing sheet embedded within the second polymer matrix, and a third layer disposed between the first and second layers, the third layer formed from a third polymer matrix having graphene nanoplatelets interspersed therein. Each of the first and second fiber reinforcing sheets is made of reinforcing fibers and includes a respective set of staggered discontinuous perforations formed therein, wherein each respective set of staggered discontinuous perforations defines a respective first plurality of reinforcing fibers having a respective first length and a respective second plurality of reinforcing fibers having a respective second length longer than the respective first length.

20 Claims, 10 Drawing Sheets

(51) Int. Cl.
    *B32B 3/26*     (2006.01)
    *B32B 38/04*    (2006.01)
    *B32B 37/06*    (2006.01)
    *B32B 5/02*     (2006.01)

(56) References Cited

U.S. PATENT DOCUMENTS

| | | |
|---|---|---|
| 10,358,767 B2 | 7/2019 | Kia et al. |
| 10,427,349 B2 | 10/2019 | Kia et al. |
| 10,612,163 B2 | 4/2020 | Kia et al. |
| 10,836,875 B2 | 11/2020 | Kia et al. |
| 2019/0177893 A1 | 6/2019 | Kia et al. |

OTHER PUBLICATIONS

Selina X. Zhao, Xiasong Huang, "Methods For Forming Class-A Components With Moldable Carbon Fiber", U.S. Appl. No. 16/703,947, filed Dec. 5, 2019, 26 pages.

POLYMERIC SANDWICH STRUCTURE HAVING ENHANCED THERMAL CONDUCTIVITY AND METHOD OF MANUFACTURING THE SAME

INTRODUCTION

This disclosure relates generally to polymeric sandwich structures having enhanced thermal conductivity, and methods of manufacturing polymeric sandwich structures having enhanced thermal conductivity.

Composite materials may be used to form a wide variety of components, such as structural members, covers and the like. Commonly used composite materials include a thermoset resin matrix having strips or lengths of reinforcing material such as carbon fiber or fiberglass embedded therein, or a thermoplastic polymer having chopped fibers embedded therein. For example, so-called "prepregs" are commonly used in compression molding to form parts, where the prepregs are sheets, strips, weaves or lengths of reinforcing material coated and imbibed with thermoset resin, which are placed into heated mold cavities and compressed with a mold plug.

One of the challenges faced in this type of approach is that it takes a certain amount of time for the heat from the heated mold to propagate through the thickness of the prepreg from the surface in contact with the heated mold cavity to the other side of the prepreg that is not in contact with the heated mold cavity.

SUMMARY

According to one embodiment, a polymeric sandwich structure having enhanced thermal conductivity includes a first layer formed from a first polymer matrix and including a first fiber reinforcing sheet embedded within the first polymer matrix, a second layer formed from a second polymer matrix and including a second fiber reinforcing sheet embedded within the second polymer matrix, and a third layer disposed between the first and second layers, wherein the third layer is formed from a third polymer matrix having graphene nanoplatelets interspersed therein. Each of the first and second fiber reinforcing sheets is made of reinforcing fibers and includes a respective set of staggered discontinuous perforations formed therein. Each respective set of staggered discontinuous perforations defines a respective first plurality of reinforcing fibers having a respective first length and a respective second plurality of reinforcing fibers having a respective second length longer than the respective first length The perforations may have an average width or diameter of about 10 to 300 microns and an average density of about 100 to 60,000 perforations per square meter. The polymeric sandwich structure may be effective to enable each of the first, second and third polymer matrices to be heated from (i) a first temperature upon placement of the polymeric sandwich structure in a heated mold with the first layer in contact with the heated mold, to (ii) at least a predetermined second temperature by continuous application of heat from the heated mold to the first layer, in 20% to 50% less time than if the third polymer matrix did not contain the graphene nanoplatelets.

The third polymer matrix may include at least 50% by volume of hollow microspheres having an average diameter of about 10 to 100 microns. The hollow microspheres may be hollow glass microspheres, and the third polymer matrix may include approximately 0.46 g/cc of the hollow glass microspheres. Each of the first, second and third polymer matrices may include a thermoset polymer or a thermoplastic polymer, and the reinforcing fibers may include carbon fibers, glass fibers, aramid fibers, basalt fibers, or any combination thereof. For example, each of the first and second polymer matrices may include a thermoset resin matrix, wherein each of the first and second fiber reinforcing sheets is a prepreg impregnated with the thermoset resin matrix. Alternatively, each of the first and second polymer matrices may include a thermoplastic polymer with at least 25% by volume of chopped fibers.

The first, second and third polymer matrices may be made of the same material as each other. Additionally, at least one of the first and second polymer matrices may include graphene nanoplatelets interspersed therein. The polymeric sandwich structure may further include a fourth layer disposed on a surface of the second layer opposite the third layer, wherein the fourth layer is formed from a fourth polymer matrix having graphene nanoplatelets interspersed therein.

According to another embodiment, a polymeric sandwich structure having enhanced thermal conductivity includes: (i) a first layer formed from a first polymer matrix and including a first fiber reinforcing sheet embedded within the first polymer matrix; (ii) a second layer formed from a second polymer matrix and including a second fiber reinforcing sheet embedded within the second polymer matrix; and (iii) a third layer disposed between the first and second layers, the third layer being formed from a third polymer matrix having graphene nanoplatelets interspersed therein and including at least 50% by volume of hollow microspheres having an average diameter of about 10 to 100 microns. Each of the first and second fiber reinforcing sheets is made of reinforcing fibers and includes a respective set of staggered discontinuous perforations formed therein having an average width or diameter of about 10 to 300 microns and an average density of about 100 to 60,000 perforations per square meter, and each respective set of staggered discontinuous perforations defines a respective first plurality of reinforcing fibers having a respective first length and a respective second plurality of reinforcing fibers having a respective second length longer than the respective first length. The polymeric sandwich structure is effective to enable each of the first, second and third polymer matrices to be heated from a first temperature upon placement of the polymeric sandwich structure in a heated mold with the first layer in contact with the heated mold, to at least a predetermined second temperature by continuous application of heat from the heated mold to the first layer, in 20% to 50% less time than if the third polymer matrix did not contain the graphene nanoplatelets.

The hollow microspheres may be hollow glass microspheres, wherein the third polymer matrix may include approximately 0.46 g/cc of the hollow glass microspheres. At least one of the first and second polymer matrices may include graphene nanoplatelets interspersed therein.

According to yet another embodiment, a method of manufacturing a flowable polymeric sandwich structure having enhanced thermal conductivity includes: dispersing graphene nanoplatelets in a solvent to produce a graphene nanoplatelet/solvent mixture; ultrasonically mixing the graphene nanoplatelet/solvent mixture to achieve a predetermined level of homogeneity; combining the graphene nanoplatelet/solvent mixture with a polymer matrix to produce a graphene nanoplatelet/solvent/polymer matrix mixture; evaporating at least a majority of the solvent from the graphene nanoplatelet/solvent/polymer matrix mixture to produce a graphene nanoplatelet/polymer matrix mixture; pressurizing the graphene nanoplatelet/polymer matrix mixture according to a pressure profile; dispersing the graphene nanoplatelet/polymer matrix mixture onto a first carrier film; sending the graphene nanoplatelet/polymer matrix mixture and first carrier film through a doctor blade arrangement to achieve a predetermined thickness of graphene nanoplatelet/polymer matrix mixture on the first carrier film, thereby producing a first mixture/carrier product; and heating the first mixture/carrier product in an oven to achieve a predetermined degree of cure and/or a predetermined viscosity of the graphene nanoplatelet/polymer matrix mixture portion of the first mixture/carrier product.

The method may further include, before the combining step: heating the polymer matrix to a predetermined temperature; and mixing hollow microspheres into the polymer matrix. The method may additionally include, after the heating step: winding the first mixture/carrier product into a roll. The method may also include: dispersing the graphene nanoplatelet/polymer matrix mixture onto a second carrier film; placing continuous fiber filaments or sheets onto or into the graphene nanoplatelet/polymer matrix mixture on the second carrier film to achieve a predetermined fiber volume fraction; producing perforations in the continuous fiber filaments or sheets using a perforation cutting head or a laser, thereby producing a second mixture/carrier product; stacking the first mixture/carrier product with the second mixture/carrier product; and heating the second mixture/carrier product in the oven along with the first mixture/carrier product to achieve the predetermined degree of cure and/or the predetermined viscosity for the graphene nanoplatelet/polymer matrix mixture portions of both the first and second mixture/carrier products. Finally, the method may further include: winding the stacked first and second mixture/carrier products into a roll.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Figure 1:
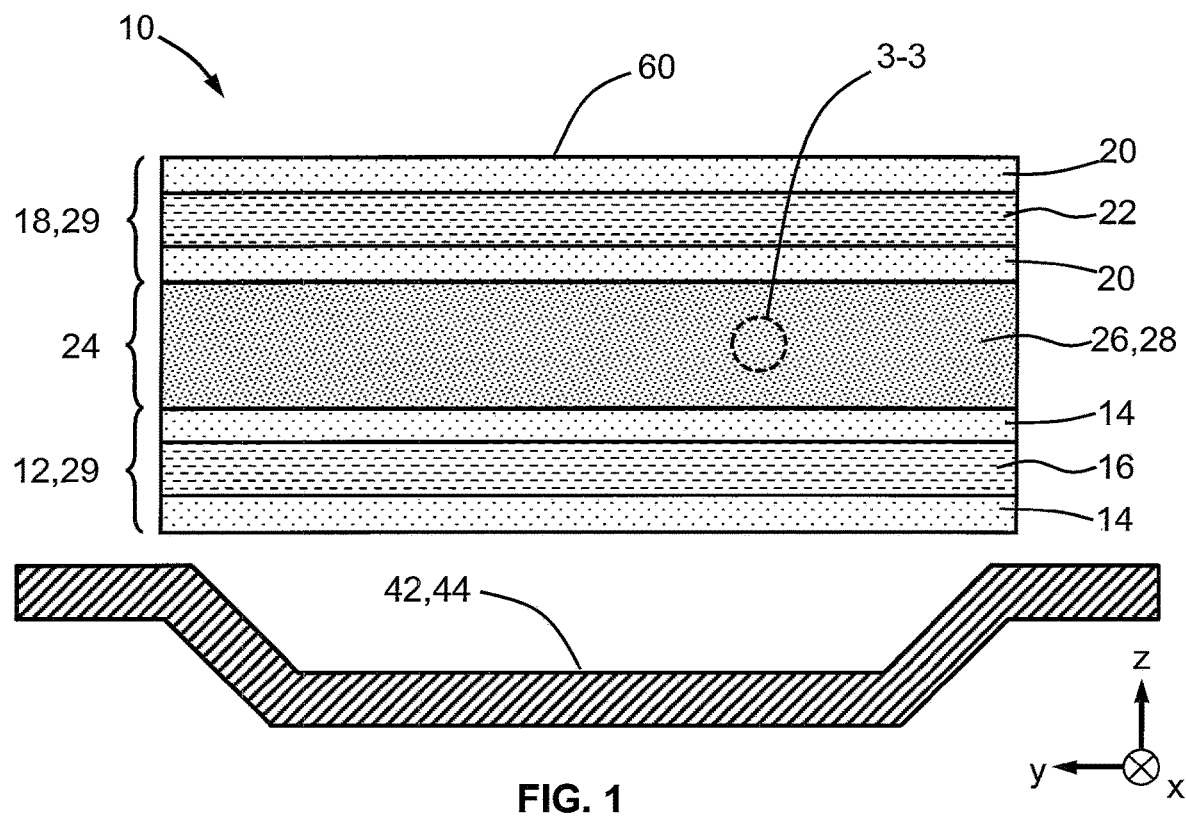
FIG. 1 is a schematic cross-sectional view of a polymeric sandwich structure having enhanced thermal conductivity.

Referring now to the drawings, wherein like numerals indicate like parts in the several views, a polymeric sandwich structure 10 having enhanced thermal conductivity, and various configurations of systems/process equipment 101, 301, 401 and methods 100, 300, 400 for manufacturing the polymeric sandwich structure 10 (including a core layer 24 and an outer layer 29 of the polymeric sandwich structure 10), are shown and described herein.

FIG. 1 shows one embodiment of a polymeric sandwich structure 10 having enhanced thermal conductivity. The polymeric sandwich structure 10 includes a first layer 12 formed from a first polymer matrix 14 and including a first fiber reinforcing sheet 16 embedded within the first polymer matrix 14, a second layer 18 formed from a second polymer matrix 20 and including a second fiber reinforcing sheet 22 embedded within the second polymer matrix 20, and a third layer 24 disposed between the first and second layers 12, 18, wherein the third layer 24 is formed from a third polymer matrix 26 having graphene nanoplatelets 28 interspersed therein. Note that the first and second layers 12, 18 may also be referred to as outer layers 29, and the third layer 24 may also be referred to as a core layer 24. Also note that while some of the drawings show the first layer 12 being disposed below the third/core layer 24 and the second layer 18 being disposed above the third/core layer 24, the positions of the first and second layers 12, 18 with respect to the third/core layer 24 as shown in the drawings may also be switched.

Figure 3:
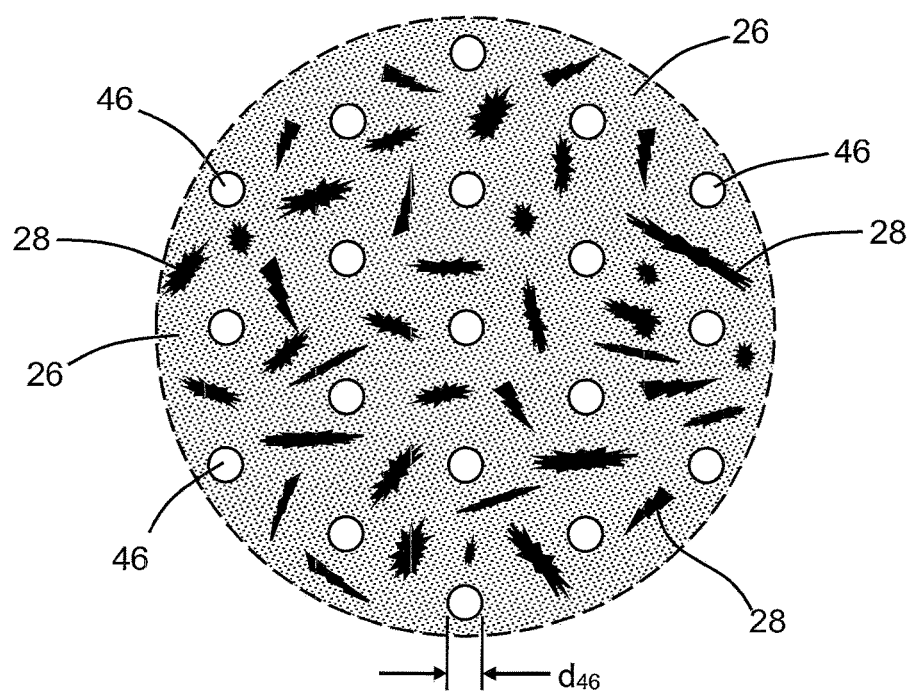
FIG. 3 shows a magnified view of the core layer within circle 3-3 of FIG. 1.

The graphene nanoplatelets 28 are shown in more detail (schematically) in FIG. 3, which shows a magnified view of the third layer 24 within circle 3-3 of FIG. 1. Here, the graphene nanoplatelets 28 are shown as being embedded and dispersed within the third polymer matrix 26. Note that while the graphene nanoplatelets 28 are shown as being clusters having a variety of shapes and sizes, the clusters of graphene nanoplatelets 28 may also have a uniform size and shape. The distribution of graphene nanoplatelets 28 throughout the third/core layer 24 provides enhanced thermal conductivity to the overall polymeric sandwich structure 10, which is discussed in more detail below.

Figure 5:
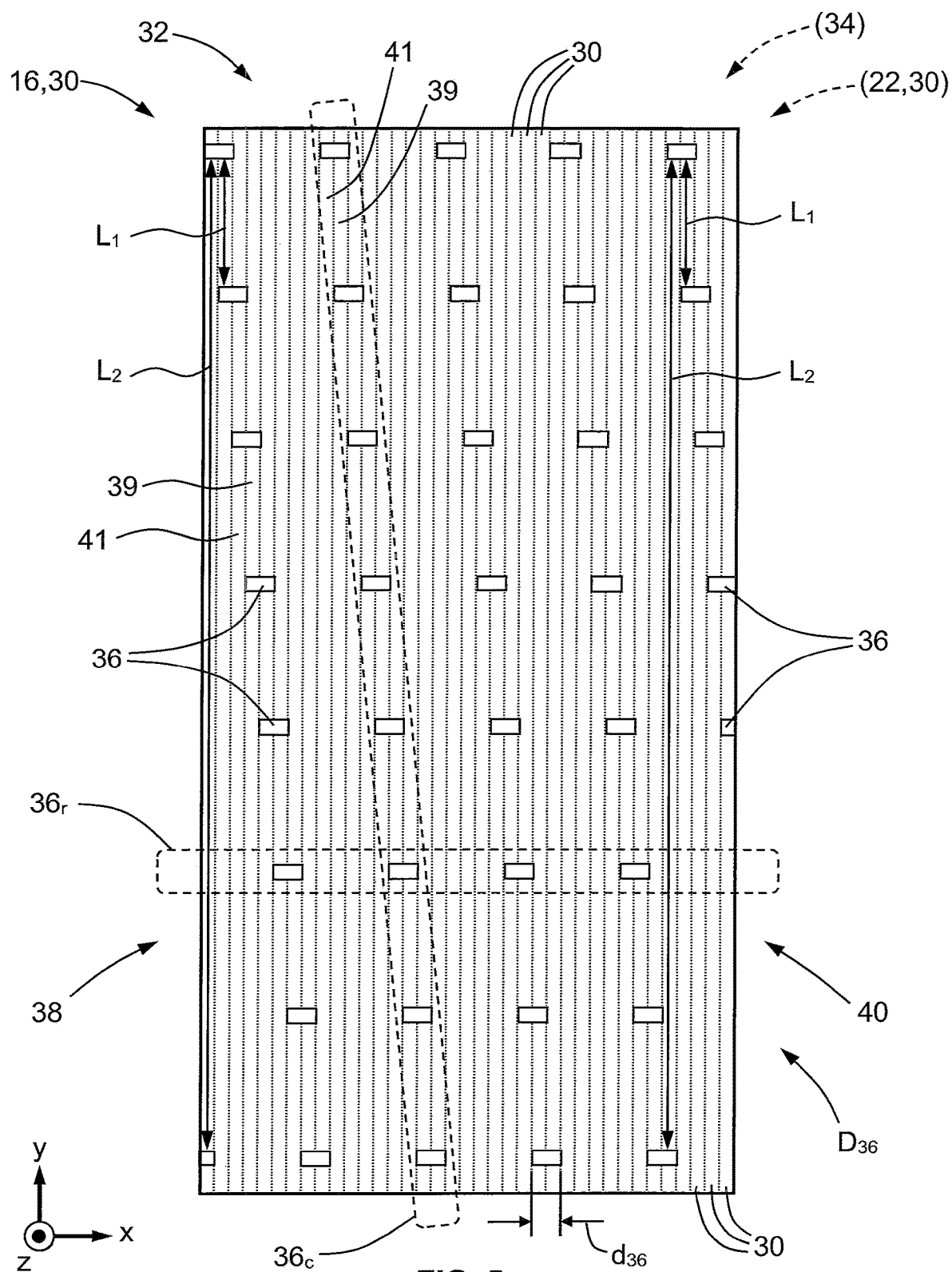
FIG. 5 is a schematic plan view of a fiber reinforcing sheet with perforations therein.

FIG. 5 shows a schematic plan view of a fiber reinforcing sheet 16, 22 having an array of staggered discontinuous perforations 36 formed therein. (FIG. 5 nominally shows a first reinforcing sheet 16, but the same structure and features may also apply to the second reinforcing sheet 22, so reference numeral 22 is shown in parentheses and dashed lead lines in the drawing.) Each of the first and second fiber reinforcing sheets 16, 22 is made of reinforcing fibers 30, and each sheet 16, 22 includes a respective set 32, 34 of staggered discontinuous perforations 36 formed therein; that is, the first fiber reinforcing sheet 16 includes a first set 32 of perforations 36, and the second fiber reinforcing sheet 22 includes a second set 34 of perforations 36. These perforations 36 represent discrete, non-contiguous, staggered cuts or voids formed in the reinforcing fibers 30, which effectively cuts the individual fibers 30 into certain lengths. Each respective set 32, 34 of perforations 36 defines a respective first plurality 38 of reinforcing fibers 30 having a respective first length $L_1$ and a respective second plurality 40 of reinforcing fibers 30 having a respective second length $L_2$ that is longer than the respective first length $L_1$. In other words, the first set 32 of perforations 36 (formed in the first fiber reinforcing sheet 16) defines two groups or pluralities of reinforcing fibers 30: a first plurality 38 of fibers 39 having a first length $L_1$, and a second plurality 40 of fibers 41 having a longer second length $L_2$, as illustrated by the double-arrowed lines in FIG. 5. Likewise, the second set 34 of perforations 36 (formed in the second fiber reinforcing sheet 22) defines its own two respective pluralities 38, 40 of reinforcing fibers 39, 41, which are separate from (but which may be similar to) the two pluralities 38, 40 of fibers 39, 41 associated with the first set 32 of perforations 36 of the first sheet 16. Thus, the second reinforcing sheet 22 also has a first plurality 38 of fibers 39 having a first length $L_1$, and a second plurality 40 of fibers 41 having a longer second length $L_2$. While it is possible that the first and second lengths $L_1$, $L_2$ associated with the first set 32 and first fiber reinforcing sheet 16 may be different from the first and second lengths $L_1$, $L_2$ associated with the second set 34 and second fiber reinforcing sheet 22, this would require forming two different patterns or spacings of perforations 36 for the two sheets 16, 22; therefore, it may be most practical to use the same pattern and spacing of perforations 36 for both sheets 16, 22, thus causing both sheets 16, 22 to have the same first length $L_1$ and the same longer second length $L_2$.

The perforations 36 may be formed in the sheets 16, 22 by use of a perforation cutting head 96 or a laser 97, as discussed in more detail below. As shown in FIG. 5, each perforation 36 may span across two adjacent individual reinforcing fibers 30, with the perforations 36 being staggered such that the two different lengths $L_1$, $L_2$ of cut fibers 39, 41 are produced. Methods for producing the perforations 36 are described in further detail below, as well as in U.S. Pat. No. 10,113,250 and U.S. Pat. App. Pub. 2018/0016740 A1, both of which are assigned to the present applicant and both of which are incorporated by reference herein in their entireties. As described in the incorporated references and as illustrated in FIG. 5, the perforations 36 may be characterized as staggered and discontinuous. "Discontinuous" means that each perforation 36 is discrete from any neighboring perforation 36, and thus each perforation 36 is not contiguous with any neighboring perforation 36. "Staggered" means that the perforations 36 are arranged such that the two discrete lengths $L_1$, $L_2$ of cut fibers 39, 41 are provided for each reinforcing fiber 30.

For example, as shown in FIG. 5, the perforations 36 may be disposed in rows 36r which are parallel with an x-axis along which the width of the sheet 16, 22 may be measured, but the perforations 36 may also be disposed along columns 36c which are askew from (i.e., not parallel with) a y-axis along which the length of the sheet 16, 22 may be measured. Here, each perforation 36 in the column 36c spans two adjacent fibers 30, with the neighboring perforation 36 above being offset one fiber 30 to the left (in the negative x-direction), and the neighboring perforation 36 below being offset one fiber to the right (in the positive x-direction). Thus, "staggered" perforations 36 or offset in at least one direction, such that the perforations 36 divide the reinforcing fibers 30 into short segments 39 having a short length $L_1$ and long segments 41 having a long length $L_2$ greater than the short length $L_1$. The perforations 36 may be rectangular shaped as shown, or oval, circular or other shape, and may have an average width or diameter $d_{36}$ of about 10 to 300 microns and an average area density $D_{36}$ of about 100 to 60,000 perforations 36 per square meter of sheet area.

Figure 12:
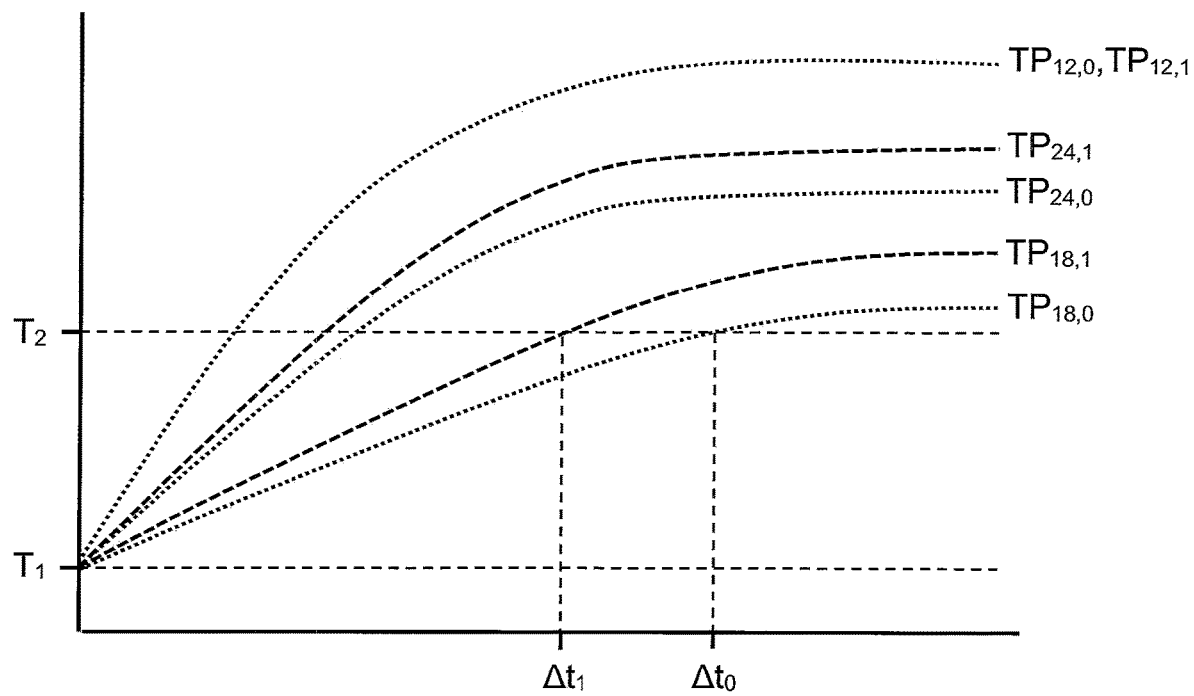
FIG. 12 shows temperature versus time profiles for heating the first, second and third layers of a polymeric sandwich structure, comparing the approach of the present disclosure versus a customary approach.

FIG. 12 shows temperature versus time profiles for heating the first, second and third layers 12, 18, 24 of the polymeric sandwich structure 10, when the polymeric sandwich structure 10 is placed in a heated mold 42 with the first layer 12 in contact with the heated mold 42. The three dotted curves labeled $TP_{12,0}$, $TP_{18,0}$ and $TP_{24,0}$ represent the temperature profiles of the first, second and third layers 12, 18, 24, respectively, according to a customary approach. Here, the temperature profiles of the three layers 12, 18, 24 each begin at around temperature $T_1$, which may be an ambient temperature or a preheated temperature, when the polymeric sandwich structure 10 is placed in the heated mold 42 with the first layer 12 in contact with the heated mold 42. Note that the temperature profile $TP_{12,0}$ of the first layer 12 heats up quicker and to a higher final temperature than the temperature profile $TP_{24,0}$ of the third/core layer 24, and the temperature profile $TP_{24,0}$ of the third/core layer 24 heats up quicker and to a higher final temperature than the temperature profile $TP_{18,0}$ of the second layer 18.

However, contrast these three profiles $TP_{12,0}$, $TP_{24,0}$, $TP_{18,0}$ of the customary approach with the three profiles $TP_{12,1}$, $TP_{24,1}$, $TP_{18,1}$ of the approach of the present disclosure. While the customary and present disclosure temperature profiles $TP_{12,0}$, $TP_{12,1}$ of the first layer 12 are essentially the same, the present disclosure temperature profiles $TP_{24,1}$, $TP_{18,1}$ of the core and second layers 24, 18 show quicker heating than their respective customary temperature profiles $TP_{24,0}$, $TP_{18,0}$. This quicker heating can be attributed to the presence of the graphene nanoplatelets 28 within the third/core layer 24, which facilitates the propagation of heat 44 from the first layer 12 (which is in contact with the heated mold 42) to the second layer 18. In turn, this quicker heating improves the overall flowability and moldability of the polymeric sandwich structure 10. For example, the polymeric sandwich structure 10 of the present disclosure may be used to mold composite parts more quickly and more easily. The quicker heating may also cause the respective viscosities of the first, second and third polymer matrices 14, 20, 26 to be more quickly and/or more closely matched with each other during heating.

In FIG. 12, $T_2$ represents a minimum temperature $T_2$ to which all three layers 12, 18, 24 must be raised in order for the polymeric sandwich structure 10 to be ready for further processing (e.g., compression molding). Thus, it can be seen that according to the customary approach it takes a given amount of time $\Delta t_0$ to heat all three layers 12, 18, 24 (and the second layer 18 in particular) from the first temperature $T_1$ to the desired second temperature $T_2$; however, it takes much less time $\Delta t_1$ to heat all three layers 12, 18, 24 to the second temperature $T_2$ using the approach of the present disclosure. Through use of the graphene nanoplatelets 28 in the third/core layer 24, the applicant of the present disclosure has discovered that the polymeric sandwich structure 10 may be effective to enable each of the first, second and third polymer matrices 14, 20, 26 to be heated from (i) a first temperature $T_1$ upon placement of the polymeric sandwich structure 10 in a heated mold 42 with the first layer 12 in contact with the heated mold 42, to (ii) at least a predetermined second temperature $T_2$ by continuous application of heat 44 from the heated mold 42 to the first layer 12, in 20% to 50% less time than if the third polymer matrix 26 did not contain the graphene nanoplatelets 28.

Figure 4:
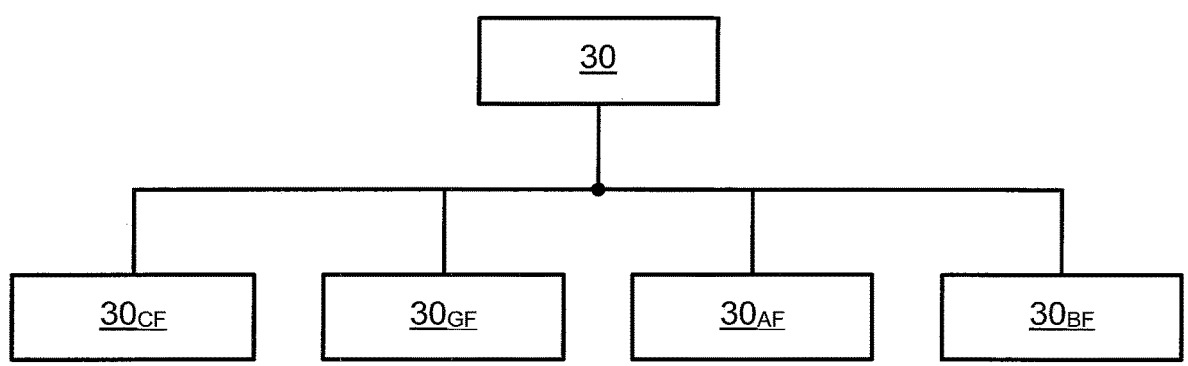
FIG. 4 is a block diagram of various types of reinforcing fibers.
Figure 13:
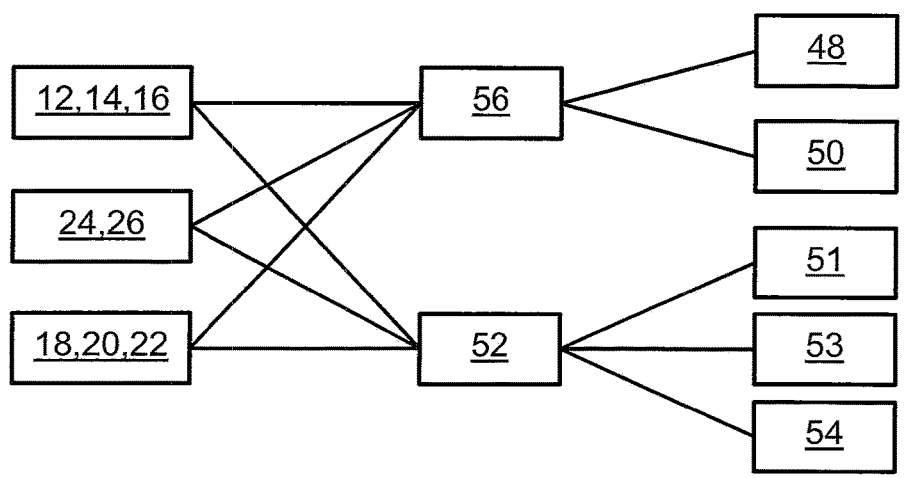
FIG. 13 is a block diagram of various polymer matrices and fibers that may be used in the first, second and third layers of the polymeric sandwich structure.

As illustrated in FIG. 3, in addition to containing graphene nanoplatelets 28 dispersed therein, the third polymer matrix 26 may also include at least 50% by volume of hollow microspheres 46 having an average diameter $d_{46}$ of about 10 to 100 microns. The hollow microspheres 46 may be hollow glass microspheres, and the third polymer matrix 26 may include approximately 0.46 g/cc of the hollow glass microspheres. Each of the first, second and third polymer matrices 14, 20, 26 may include a thermoset polymer 56 (e.g., a two-part resin) or a thermoplastic polymer 52 (e.g., nylon, acrylonitrile-butadiene-styrene (ABS), etc.). As illustrated by the block diagram in FIG. 4, the reinforcing fibers 30 may include carbon fibers $30_{CF}$, glass fibers $30_{GF}$, aramid fibers $30_{AF}$, basalt fibers $30_{BF}$, or any combination thereof. And as shown by the block diagram of FIG. 13, which illustrates various polymer matrices 14, 20, 26 and fibers that may be used in the first, second and third layers 12, 18, 24, each of the first and second polymer matrices 14, 20 may include a thermoset resin matrix 48, wherein each of the first and second fiber reinforcing sheets 16, 22 is a prepreg 50 impregnated with the thermoset resin matrix 48. In this arrangement, the third/core layer 24 may also include a thermoset resin matrix 48. Alternatively, each of the first and second polymer matrices 14, 20 may include a semi-crystalline thermoplastic polymer 51 or an amorphous thermoplastic polymer 53, containing an optional filler of at least 25% by volume of chopped fibers 54. In this arrangement, the third/core layer 24 may also include a semi-crystalline or amorphous thermoplastic polymer 51, 53.

Figure 2:
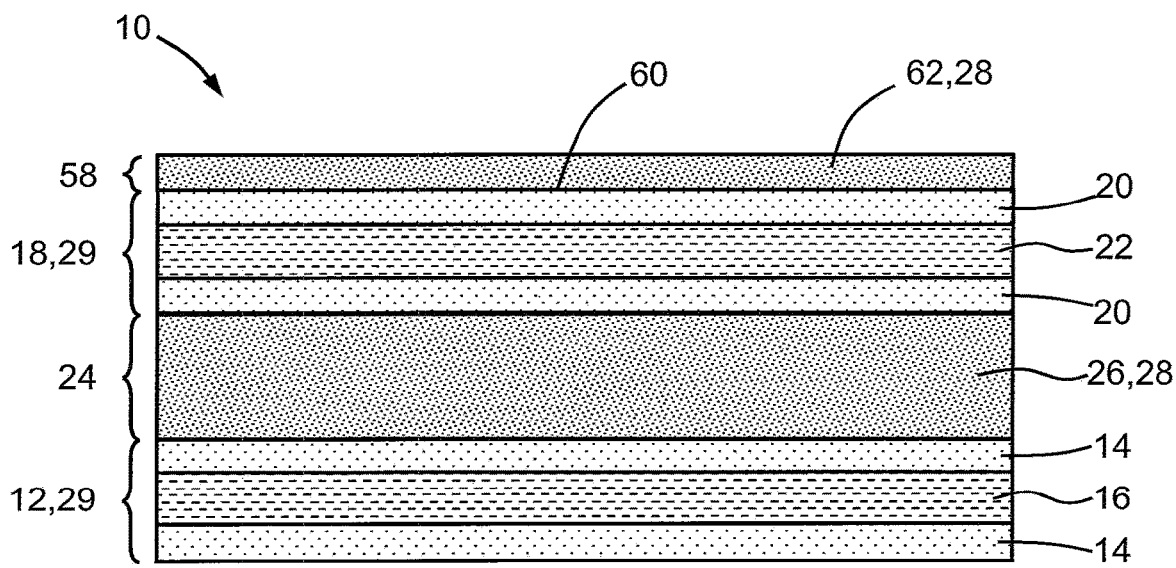
FIG. 2 is a schematic cross-sectional view of an alternative polymeric sandwich structure having a fourth layer.

The first, second and third polymer matrices 14, 20, 26 may be made of the same material as each other. For example, all three matrices 14, 20, 26 may be a thermoset resin matrix 48, or all three may be an amorphous thermoplastic polymer 53. Additionally, the first polymer matrix 14, the second polymer matrix 20, or both matrices 14, 20, may include graphene nanoplatelets 28 interspersed therein, which may further enhance the overall thermal conductivity and moldability of the polymeric sandwich structure 10. As illustrated by FIG. 2, the polymeric sandwich structure 10 may further include a fourth layer 58 disposed on a surface 60 of the second layer 18 opposite the third layer 24, wherein the fourth layer 58 is formed from a fourth polymer matrix 62 having graphene nanoplatelets 28 interspersed therein. This additional fourth layer 58 containing graphene nanoplatelets 28 may serve as an EMI (electro-magnetic interference) shield and/or as a ground plane, due to the electrical conductivity of the graphene nanoplatelets 28.

According to another embodiment, a polymeric sandwich structure 10 having enhanced thermal conductivity includes: (i) a first layer 12 formed from a first polymer matrix 14 and including a first fiber reinforcing sheet 16 embedded within the first polymer matrix 14; (ii) a second layer 18 formed from a second polymer matrix 20 and including a second fiber reinforcing sheet 22 embedded within the second polymer matrix 20; and (iii) a third layer 24 disposed between the first and second layers 12, 18, the third layer 24 being formed from a third polymer matrix 26 having graphene nanoplatelets 28 interspersed therein and including at least 50% by volume of hollow microspheres 46 having an average diameter $d_{46}$ of about 10 to 100 microns. Each of the first and second fiber reinforcing sheets 16, 22 is made of reinforcing fibers 30 and includes a respective set 32, 34 of staggered discontinuous perforations 36 formed therein having an average width or diameter $d_{36}$ of about 10 to 300 microns and an average density $D_{36}$ of about 100 to 60,000 perforations 36 per square meter, and each respective set 32, 34 of staggered discontinuous perforations 36 defines a respective first plurality 38 of reinforcing fibers 30 having a respective first length $L_1$ and a respective second plurality 40 of reinforcing fibers 30 having a respective second length $L_2$ longer than the respective first length $L_1$. The polymeric sandwich structure 10 is effective to enable each of the first, second and third polymer matrices 14, 20, 26 to be heated from a first temperature $T_1$ upon placement of the polymeric sandwich structure 10 in a heated mold 42 with the first layer 12 in contact with the heated mold 42, to at least a predetermined second temperature $T_2$ by continuous application of heat 44 from the heated mold 42 to the first layer 12, in 20% to 50% less time than if the third polymer matrix 26 did not contain the graphene nanoplatelets 28.

The hollow microspheres 46 may be hollow glass microspheres, wherein the third polymer matrix 26 may include approximately 0.46 g/cc of the hollow glass microspheres. At least one of the first and second polymer matrices 14, 20 may include graphene nanoplatelets 28 interspersed therein.

Figure 6:
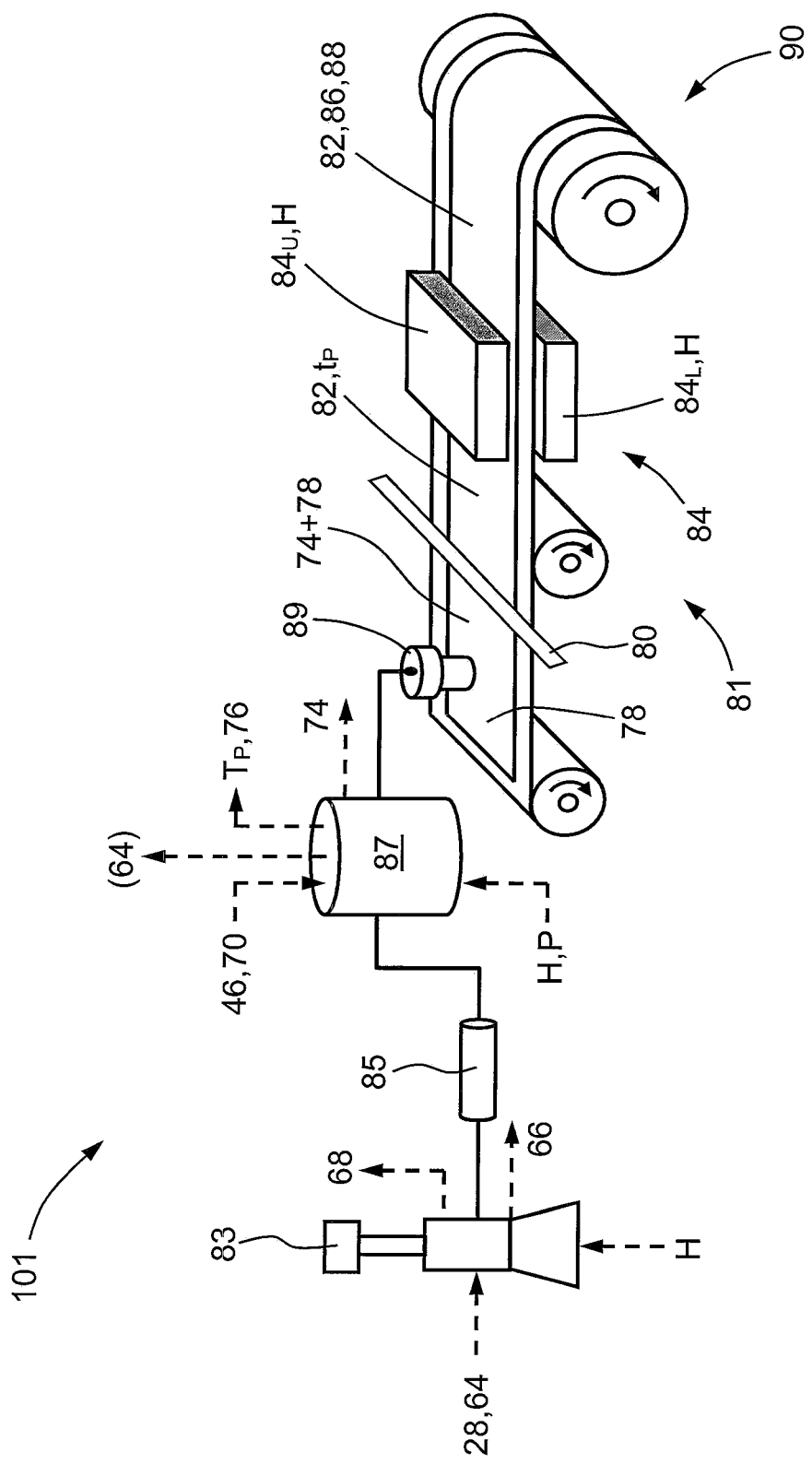
FIG. 6 is a schematic view of process equipment for manufacturing a core layer for the polymeric sandwich structure.
Figure 7:
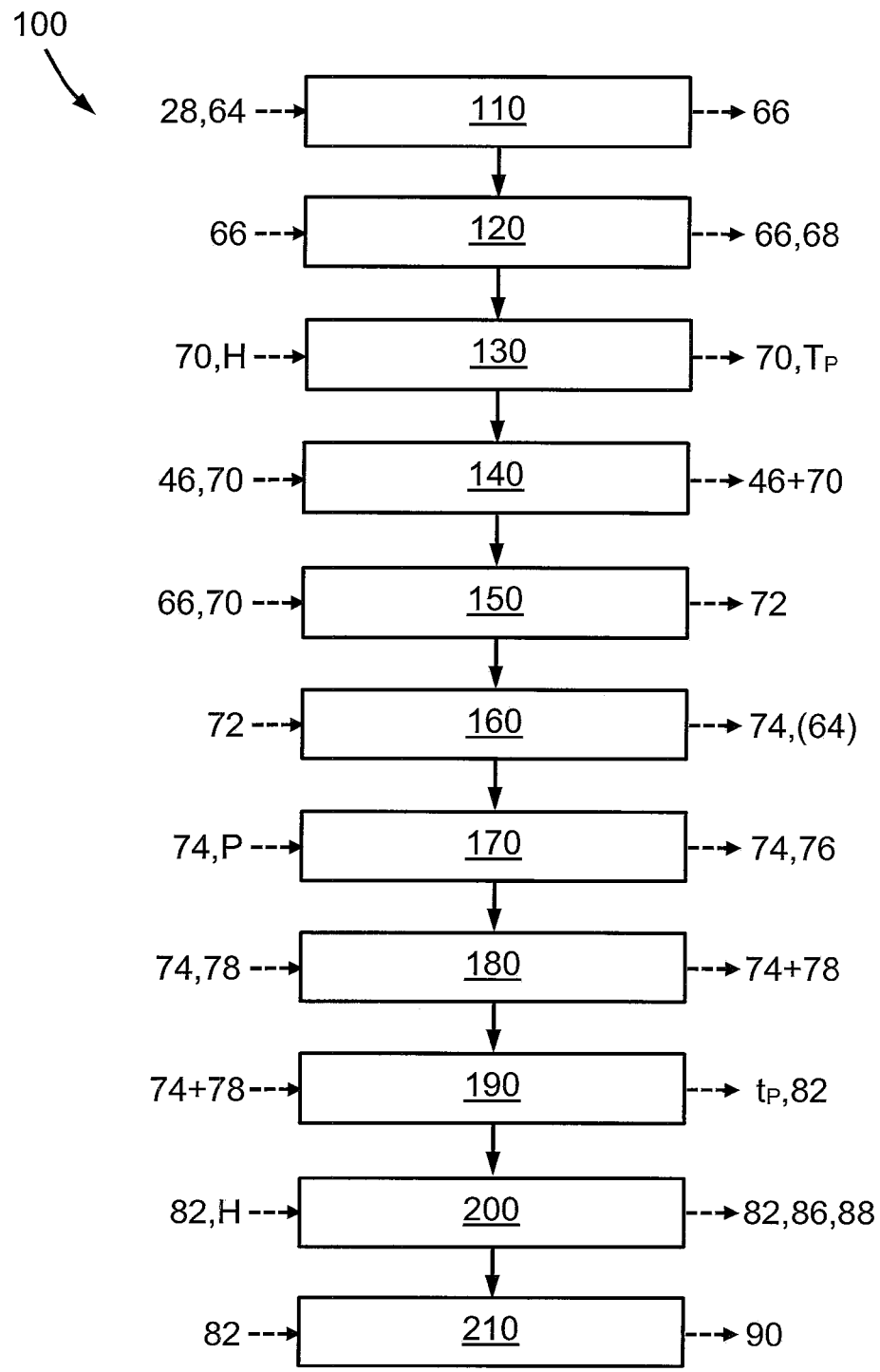
FIG. 7 is a flowchart for a method of manufacturing the core layer for the polymeric sandwich structure.
Figure 8:
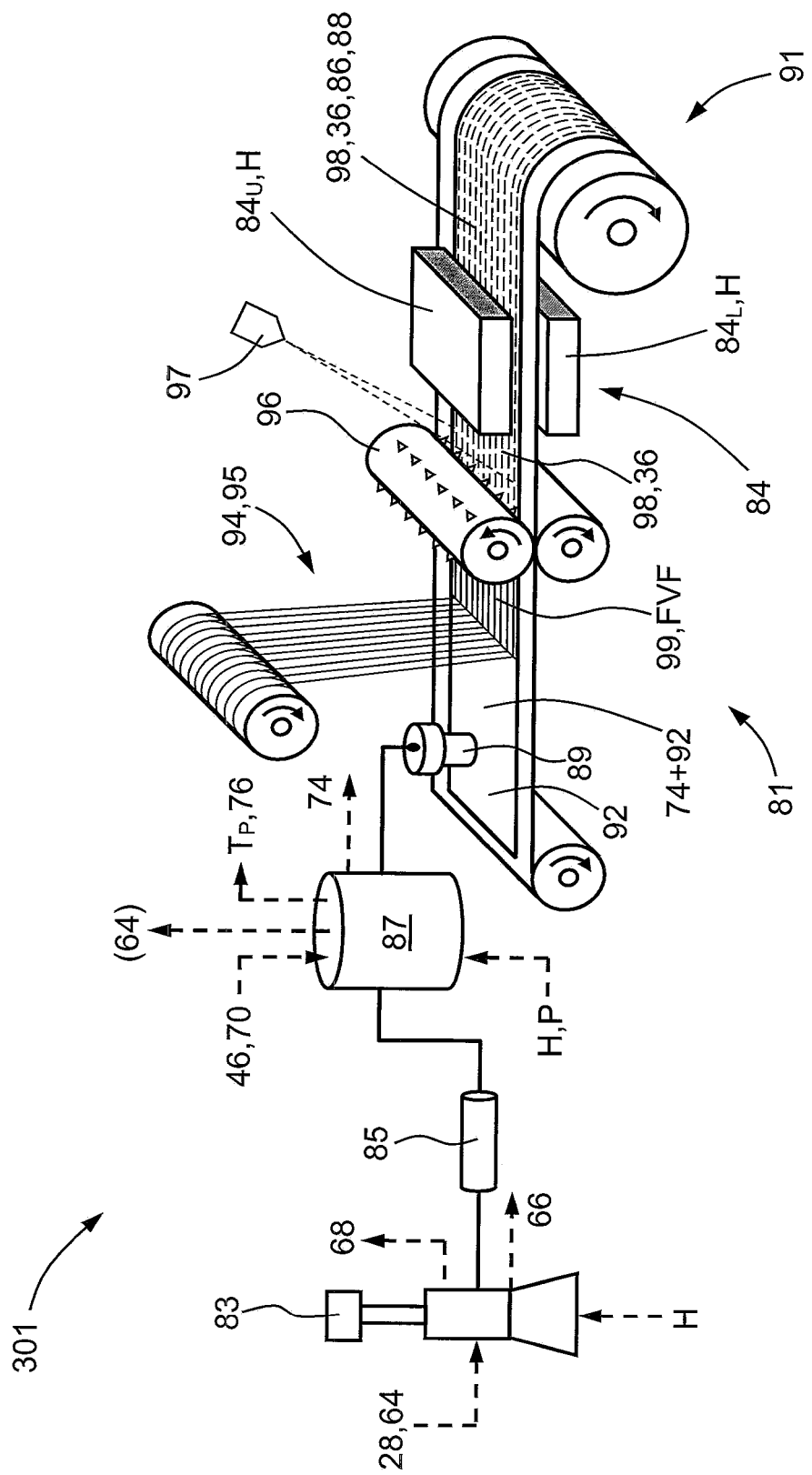
FIG. 8 is a schematic view of process equipment for manufacturing an outer layer for the polymeric sandwich structure.
Figure 9:
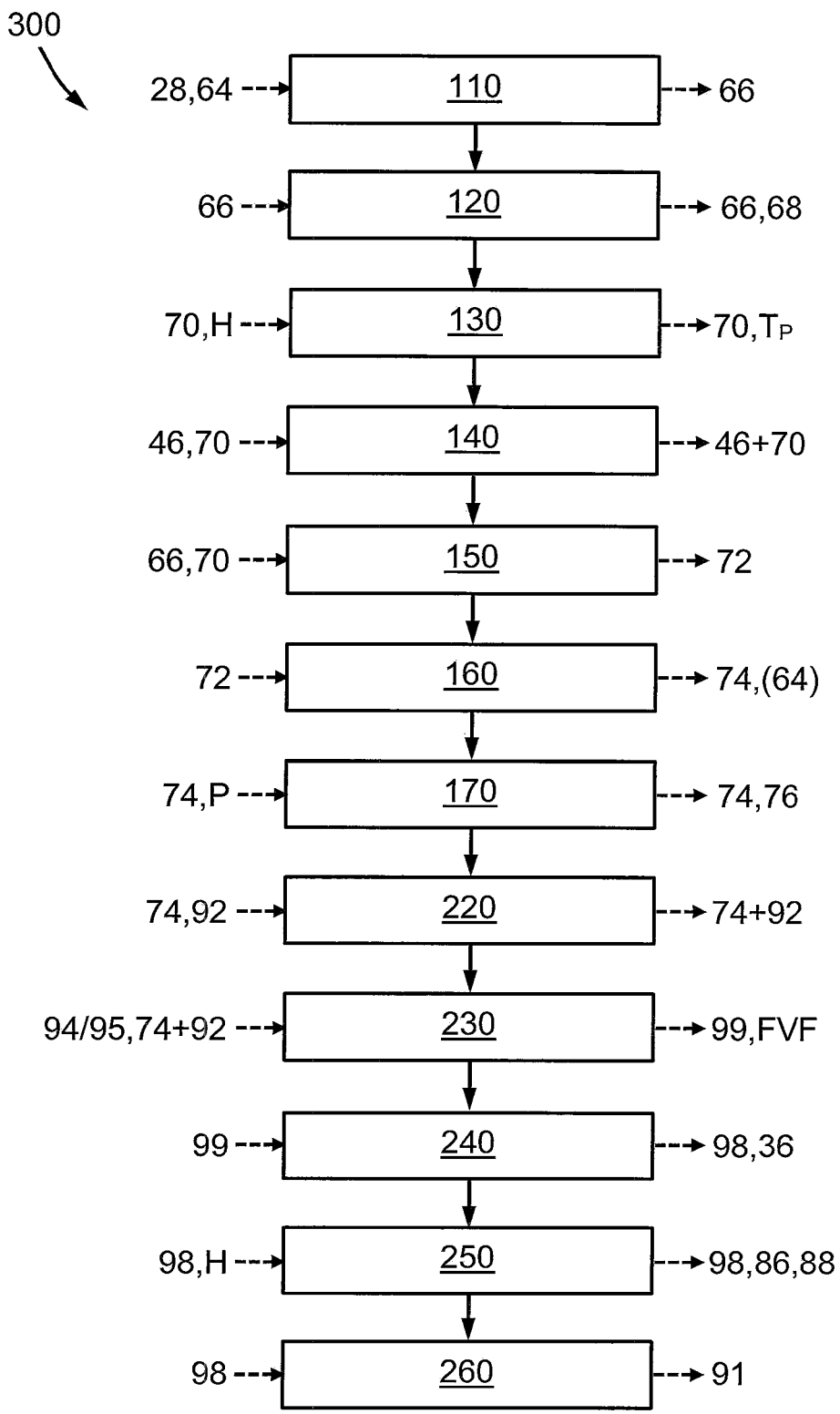
FIG. 9 is a flowchart for a method of manufacturing the outer layer for the polymeric sandwich structure.
Figure 10:
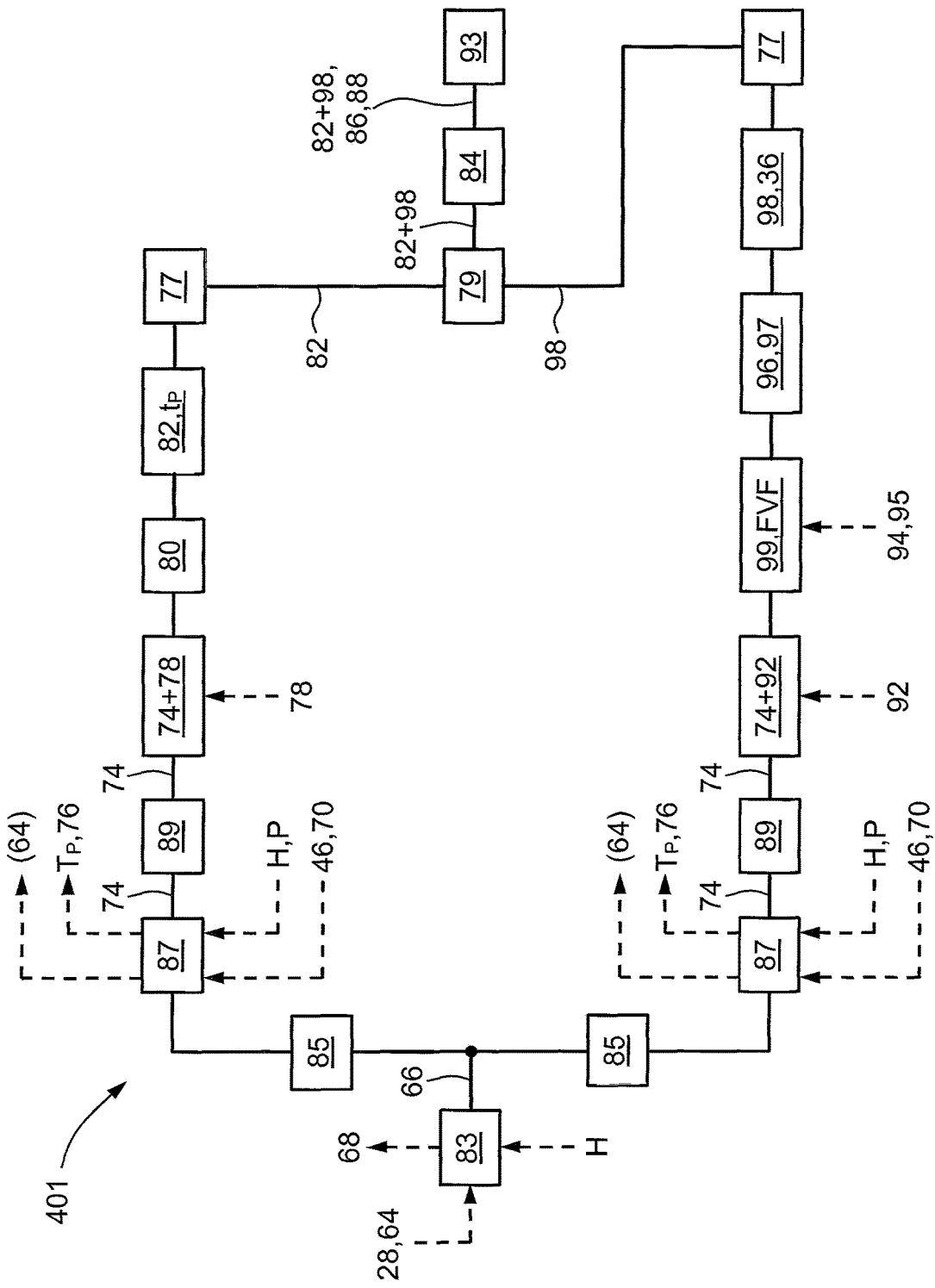
FIG. 10 is a schematic view of process equipment for manufacturing both a core layer and an outer layer for the polymeric sandwich structure.
Figure 11:
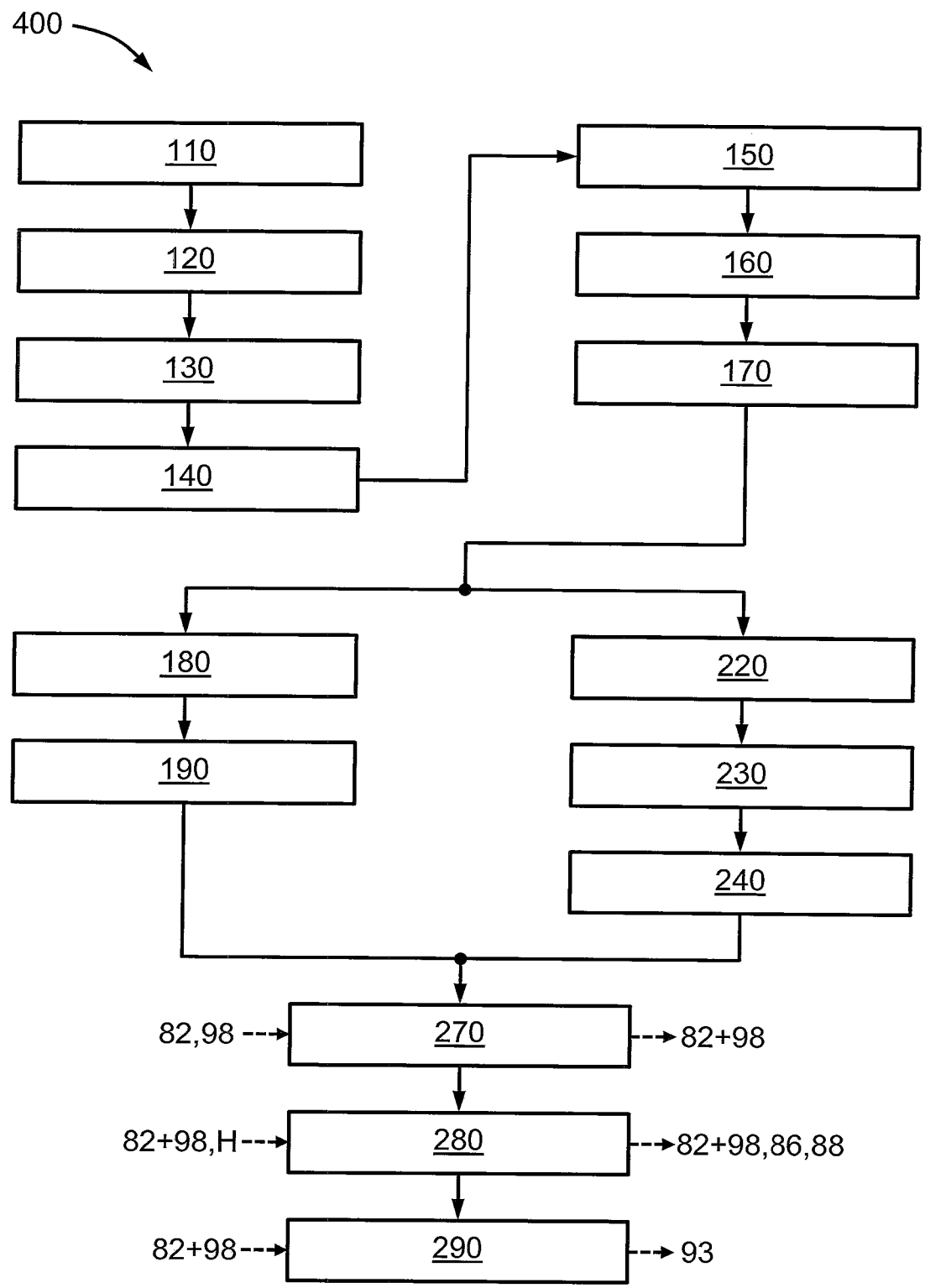
FIG. 11 is a flowchart for a method of manufacturing both the core layer and the outer layer for the polymeric sandwich structure.

FIGS. 6-11 illustrate various configurations of systems/process equipment and methods for manufacturing the core layer 24 and outer layer 29 for the flowable polymeric sandwich structure 10 having enhanced thermal conductivity. More specifically, FIGS. 6-7 show a system/process equipment 101 and a method 100, respectively, for manufacturing the core layer 24, FIGS. 8-9 show a system/process equipment 301 and a method 300, respectively, for manufacturing an outer layer 29, and FIGS. 10-11 show a system/process equipment 401 and a method 400, respectively, for manufacturing both the core layer 24 and the outer layer 29 together. Note that each of the flowcharts shown in FIGS. 7, 9 and 11 has solid arrows connecting the various blocks or steps as in typical flowcharts. However, these flowcharts also have dashed arrows pointing toward the blocks from the left, which represent inputs or starting materials for each block, and dashed arrows pointing away from the blocks to the right, which represent outputs or resulting materials for each block. Also note that while the systems/process equipment 101, 301, 401 illustrated in FIGS. 6, 8 and 10 show the pieces of process equipment in a particular order, it should be apparent that the equipment may be arranged in other ways and that the equipment and spacings therebetween are not necessarily drawn to scale.

Referring to FIGS. 6-7, a method 100 and system/process equipment 101 for manufacturing the core layer 24 will now be described. At block 110, graphene nanoplatelets 28 are dispersed in a solvent 64 (e.g., alcohol, acetone, etc.) to produce a graphene nanoplatelet/solvent mixture 66. At block 120, the graphene nanoplatelet/solvent mixture 66 is ultrasonically mixed in an ultrasonic mixer 83 (and optionally heated with heat H) to achieve a predetermined level of homogeneity and/or dispersion 68. Note that the step of dispersing the graphene nanoplatelets 28 in the solvent 64 in block 110 may be carried out by placing the graphene nanoplatelets 28 and the solvent 64 in the ultrasonic mixer 83 and mixing/dispersing those ingredients 28, 64 in the ultrasonic mixer 83, as shown in FIG. 6; or, the ingredients 28, 64 may be mixed/dispersed in a separate vessel (not shown) prior to moving the graphene nanoplatelet/solvent mixture 66 to the ultrasonic mixer 83. At block 150, the graphene nanoplatelet/solvent mixture 66 is combined with a polymer matrix 70 to produce a graphene nanoplatelet/solvent/polymer matrix mixture 72. (The polymer matrix 70 may be a thermoplastic polymer 52 or a thermoset polymer 56.) At block 160, some or all (e.g., at least a majority) of the solvent 64 is evaporated from the graphene nanoplatelet/solvent/polymer matrix mixture 72 to produce a graphene nanoplatelet/polymer matrix mixture 74. (Note that reference numeral 64 is shown in parentheses to the right of block 160; this is to indicate that the evaporated solvent 64 is not used in the subsequent process steps.) At block 170, the graphene nanoplatelet/polymer matrix mixture 74 is pressurized with pressure P in a tank or sealed vessel 87 according to a pressure profile 76. The pressure profile 76 may be merely a desired or target pressure level, or it may be a pressure versus time curve. At block 180, the graphene nanoplatelet/polymer matrix mixture 74 is dispersed by a dispersion head 89 (attached to the pressurized tank 87) onto a first carrier film 78, which may be carried on a conveyor 81. Note that the combination of the graphene nanoplatelet/polymer matrix mixture 74 and the first carrier film 78 is represented by reference numeral 74+78 to the right of block 180. At block 190, the combined graphene nanoplatelet/polymer matrix mixture/first carrier film 74+78 are sent (via the conveyor 81) through a doctor blade arrangement 80 to achieve a predetermined thickness $t_P$ of graphene nanoplatelet/polymer matrix mixture 74 on the first carrier film 78, thereby producing a first mixture/carrier product 82. And at block 200, the first mixture/carrier product 82 is heated with heat H in an oven 84 (having an upper heating element 84$_U$ and/or a lower heating element 84L) to achieve a predetermined degree of cure 86 and/or a predetermined viscosity 88 of the graphene nanoplatelet/polymer matrix mixture portion 74 of the first mixture/carrier product 82.

The method 100 may further include (before the combining step of block 150): at block 130, heating the polymer matrix 70 with heat H to a predetermined temperature $T_P$ (e.g., a melt temperature); and, at block 140, mixing hollow microspheres 46 into the polymer matrix 70. (Note that the combination of the polymer matrix 70 and the hollow microspheres 46 is represented by reference numeral 46+70 to the right of block 140). In block 150, the reference numeral 70 to the left of block 150 may also include or be interpreted as reference numeral 46+70; thus, reference numeral 70 to the left of block 150 may optionally include polymer matrix 70 with hollow microspheres 46 mixed therein.) The method 100 may additionally include (after the heating step of block 200): at block 210, winding the first mixture/carrier product 82 into a roll 90 (i.e., a roll of first mixture/carrier product 82). And, as shown in FIG. 6, the system/process equipment 101 may include various pumps 85, along with valves and pipes (not labeled), for conveying materials used in the method or process 100.

Referring to FIGS. 8-9, a method 300 and system/process equipment 301 for manufacturing an outer layer 29 will now be described. (Note that this method 300 and system/process equipment 301 share some of the same features as method 100 and system/process equipment 101.) The outer layer 29 may be used as a first layer 12 and/or as a second layer 18. The outer layer 29 may be manufactured with or without graphene nanoplatelets 28 and with or without hollow microspheres 46, but the method 300 and system/process equipment 301 will be described as if the optional graphene nanoplatelets 28 and the hollow microspheres 46 are included in the outer layer 29. At block 110, graphene nanoplatelets 28 are dispersed in a solvent 64 to produce a graphene nanoplatelet/solvent mixture 66. At block 120, the graphene nanoplatelet/solvent mixture 66 is ultrasonically mixed in an ultrasonic mixer 83 (and optionally heated with heat H) to achieve a predetermined level of homogeneity 68. At block 150, the graphene nanoplatelet/solvent mixture 66 is combined with a polymer matrix 70 to produce a graphene nanoplatelet/solvent/polymer matrix mixture 72. At block 160, at least a majority of the solvent 64 is evaporated from the graphene nanoplatelet/solvent/polymer matrix mixture 72 to produce a graphene nanoplatelet/polymer matrix mixture 74. At block 170, the graphene nanoplatelet/polymer matrix mixture 74 is pressurized with pressure P in a tank or sealed vessel 87 according to a pressure profile 76. At block 220, the graphene nanoplatelet/polymer matrix mixture 74 is dispersed by a dispersion head 89 (attached to the pressurized tank 87) onto a second carrier film 92, resulting in the combined graphene nanoplatelet/polymer matrix mixture/second carrier film 74+92. At block 230, continuous fiber filaments 94 or sheets 95 are placed onto or into the graphene nanoplatelet/polymer matrix mixture/second carrier film 74+92, thereby producing an intermediate product 99 and achieving a predetermined fiber volume fraction FVF in the intermediate product 99. The fiber volume fraction FVF is a measure of how much of the intermediate product 99 is made up of the continuous fiber filaments 94 or sheets 95, either by weight or volume, and expressed as a percentage, decimal or fraction. The continuous fiber filaments 94 or sheets 95 may be made of the reinforcing fiber 30, such as carbon fiber. At block 240, perforations 36 are produced in the continuous fiber filaments 94 or sheets 95 of the intermediate product 99 using a perforation cutting head 96 or a laser 97, thereby producing a second mixture/carrier product 98. At block 250, the second mixture/carrier product 98 is heated in an oven 84 to achieve a predetermined degree of cure 86 and/or a predetermined viscosity 88 for the graphene nanoplatelet/polymer matrix mixture portion 74 of the second mixture/carrier product 98. And at block 260, the second mixture/carrier product 98 may be wound into a roll 91 (i.e., a roll of second mixture/carrier product 98). Method 300 and system/process equipment 301 may also include the steps represented by blocks 130 and 140 described in reference to method 100 and system/process equipment 101 above.

Referring to FIGS. 10-11, a method 400 and system/process equipment 401 for manufacturing both a core layer 24 and an outer layer 29 together will now be described. (Note that this method 400 and system/process equipment 401 share some of the same features as methods 100 and 300 and systems/process equipment 101 and 301.) As mentioned above in connection with method 300, system/process equipment 301 and FIGS. 8-9, the outer layer 29 may be manufactured with or without graphene nanoplatelets 28 and with or without hollow microspheres 46, but the method 400 and system/process equipment 401 of FIGS. 10-11 will be described as if the optional graphene nanoplatelets 28 and the hollow microspheres 46 are included in the outer layer 29. At block 110, graphene nanoplatelets 28 are dispersed in a solvent 64 to produce a graphene nanoplatelet/solvent mixture 66. At block 120, the graphene nanoplatelet/solvent mixture 66 is ultrasonically mixed to achieve a predetermined level of homogeneity 68. At block 150, the graphene nanoplatelet/solvent mixture 66 is combined with a polymer matrix 70 to produce a graphene nanoplatelet/solvent/polymer matrix mixture 72. At block 160, at least a majority of the solvent 64 is evaporated from the graphene nanoplatelet/solvent/polymer matrix mixture 72 to produce a graphene nanoplatelet/polymer matrix mixture 74. At block 170, the graphene nanoplatelet/polymer matrix mixture 74 is pressurized according to a pressure profile 76. At block 180, the graphene nanoplatelet/polymer matrix mixture 74 is dispersed onto a first carrier film 78. At block 190, the graphene nanoplatelet/polymer matrix mixture 74 and first carrier film 78 are sent through a doctor blade arrangement 80 to achieve a predetermined thickness $t_P$ of graphene nanoplatelet/polymer matrix mixture 74 on the first carrier film 78, thereby producing a first mixture/carrier product 82. At block 220, the graphene nanoplatelet/polymer matrix mixture 74 is dispersed onto a second carrier film 92. At block 230, continuous fiber filaments 94 or sheets 95 are placed onto or into the graphene nanoplatelet/polymer matrix mixture 74 on the second carrier film 92 to achieve a predetermined fiber volume fraction FVF. At block 240, perforations 36 are produced in the continuous fiber filaments 94 or sheets 95 using a perforation cutting head 96 or a laser 97, thereby producing a second mixture/carrier product 98. At block 270, the first mixture/carrier product 82 is stacked with the second mixture/carrier product 98, such as by using respective rollers 77 to redirect the first and second mixture/carrier products 82, 98 toward a dual roller arrangement 79 which stacks the first and mixture/carrier products 82, 98 together to produce a combined first-and-second mixture/carrier product 82+98. At block 280, the second mixture/carrier product 98 is heated in an oven 84 along with the first mixture/carrier product 82 (by conveying the combined first-and-second mixture/carrier product 82+98 through the oven 84) in order to achieve a predetermined degree of cure 86 and/or a predetermined viscosity 88 for the graphene nanoplatelet/polymer matrix mixture portions 74 of both the first and second mixture/carrier products 82, 98. And at block 290, the stacked first and second mixture/carrier products 82, 98 are wound into a roll 93 (i.e., a roll of stacked first and second mixture/carrier products 82, 98). Method 400 and system/process equipment 401 may also include the steps represented by blocks 130 and 140 described in reference to method 100 and system/process equipment 101 above.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "for the most part", "to a significant extent" and/or "to a large degree", and do not necessarily mean "perfectly", "completely", "strictly" or "entirely". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like. Also, note that the x-, y- and z-directions or axes shown in FIGS. 1 and 5 follow the right-hand rule convention, nominally representing directions for width, length and height, respectively.

The flowcharts and block diagrams in the drawings illustrate the architecture, functionality and/or operation of possible implementations of systems, methods and computer program products according to various embodiments of the present disclosure. In this regard, each block in the flowchart or block diagrams may represent a module, segment or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by hardware-based systems that perform the specified functions or acts, or combinations of hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the functions and/or actions specified in the flowcharts and block diagrams.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A polymeric sandwich structure having enhanced thermal conductivity, comprising:
   a first layer formed from a first polymer matrix and including a first fiber reinforcing sheet embedded within the first polymer matrix;
   a second layer formed from a second polymer matrix and including a second fiber reinforcing sheet embedded within the second polymer matrix; and
   a third layer disposed between the first and second layers, the third layer formed from a third polymer matrix having graphene nanoplatelets interspersed therein;
   wherein each of the first and second fiber reinforcing sheets is made of reinforcing fibers and includes a respective set of staggered discontinuous perforations formed therein, wherein each respective set of staggered discontinuous perforations defines a respective first plurality of reinforcing fibers having a respective first length and a respective second plurality of reinforcing fibers having a respective second length longer than the respective first length.

2. A polymeric sandwich structure according to claim 1, wherein the perforations have an average width or diameter of about 10 to 300 microns and an average density of about 100 to 60,000 perforations per square meter.

3. A polymeric sandwich structure according to claim 1, wherein the polymeric sandwich structure is effective to enable each of the first, second and third polymer matrices to be heated from (i) a first temperature upon placement of the polymeric sandwich structure in a heated mold with the first layer in contact with the heated mold, to (ii) at least a predetermined second temperature by continuous application of heat from the heated mold to the first layer, in 20% to 50% less time than if the third polymer matrix did not contain the graphene nanoplatelets.

4. A polymeric sandwich structure according to claim 1, wherein the third polymer matrix includes at least 50% by volume of hollow microspheres having an average diameter of about 10 to 100 microns.

5. A polymeric sandwich structure according to claim 4, wherein the hollow microspheres are hollow glass microspheres, and wherein the third polymer matrix includes approximately 0.46 g/cc of the hollow glass microspheres.

6. A polymeric sandwich structure according to claim 1, wherein each of the first and second polymer matrices includes a thermoset resin matrix, and wherein each of the first and second fiber reinforcing sheets is a prepreg impregnated with the thermoset resin matrix.

7. A polymeric sandwich structure according to claim 1, wherein each of the first and second polymer matrices includes a thermoplastic polymer with at least 25% by volume of chopped fibers.

8. A polymeric sandwich structure according to claim 1, wherein each of the first, second and third polymer matrices includes a thermoset polymer or a thermoplastic polymer.

9. A polymeric sandwich structure according to claim 1, wherein the reinforcing fibers includes carbon fibers, glass fibers, aramid fibers, basalt fibers, or any combination thereof.

10. A polymeric sandwich structure according to claim 1, wherein at least one of the first and second polymer matrices includes graphene nanoplatelets interspersed therein.

11. A polymeric sandwich structure according to claim 1, wherein the first, second and third polymer matrices are made of the same material as each other.

12. A polymeric sandwich structure according to claim 1, further including a fourth layer disposed on a surface of the second layer opposite the third layer, the fourth layer formed from a fourth polymer matrix having graphene nanoplatelets interspersed therein.

13. A polymeric sandwich structure having enhanced thermal conductivity, comprising:
a first layer formed from a first polymer matrix and including a first fiber reinforcing sheet embedded within the first polymer matrix;
a second layer formed from a second polymer matrix and including a second fiber reinforcing sheet embedded within the second polymer matrix; and
a third layer disposed between the first and second layers, the third layer formed from a third polymer matrix having graphene nanoplatelets interspersed therein and including at least 50% by volume of hollow microspheres having an average diameter of about 10 to 100 microns;
wherein each of the first and second fiber reinforcing sheets is made of reinforcing fibers and includes a respective set of staggered discontinuous perforations formed therein having an average width or diameter of about 10 to 300 microns and an average density of about 100 to 60,000 perforations per square meter, wherein each respective set of staggered discontinuous perforations defines a respective first plurality of reinforcing fibers having a respective first length and a respective second plurality of reinforcing fibers having a respective second length longer than the respective first length; and
wherein the polymeric sandwich structure is effective to enable each of the first, second and third polymer matrices to be heated from (i) a first temperature upon placement of the polymeric sandwich structure in a heated mold with the first layer in contact with the heated mold, to (ii) at least a predetermined second temperature by continuous application of heat from the heated mold to the first layer, in 20% to 50% less time than if the third polymer matrix did not contain the graphene nanoplatelets.

14. A polymeric sandwich structure according to claim 13, wherein the hollow microspheres are hollow glass microspheres, and wherein the third polymer matrix includes approximately 0.46 g/cc of the hollow glass microspheres.

15. A polymeric sandwich structure according to claim 13, wherein at least one of the first and second polymer matrices includes graphene nanoplatelets interspersed therein.

16. A method of manufacturing a flowable polymeric sandwich structure having enhanced thermal conductivity, comprising:
dispersing graphene nanoplatelets in a solvent to produce a graphene nanoplatelet/solvent mixture;
ultrasonically mixing the graphene nanoplatelet/solvent mixture to achieve a predetermined level of homogeneity;
combining the graphene nanoplatelet/solvent mixture with a polymer matrix to produce a graphene nanoplatelet/solvent/polymer matrix mixture;
evaporating at least a majority of the solvent from the graphene nanoplatelet/solvent/polymer matrix mixture to produce a graphene nanoplatelet/polymer matrix mixture;
pressurizing the graphene nanoplatelet/polymer matrix mixture according to a pressure profile;
dispersing the graphene nanoplatelet/polymer matrix mixture onto a first carrier film;
sending the graphene nanoplatelet/polymer matrix mixture and first carrier film through a doctor blade arrangement to achieve a predetermined thickness of graphene nanoplatelet/polymer matrix mixture on the first carrier film;
heating the graphene nanoplatelet/polymer matrix mixture to achieve a predetermined degree of cure and/or a predetermined viscosity of the graphene nanoplatelet/polymer matrix mixture, thereby producing a core layer;
providing a first layer formed from a first polymer matrix with a first fiber reinforcing sheet embedded within the first polymer matrix, and a second layer formed from a second polymer matrix with a second fiber reinforcing sheet embedded within the second polymer matrix, wherein each of the first and second fiber reinforcing sheets is made of reinforcing fibers;
producing a respective set of staggered discontinuous perforations in each of the first and second fiber reinforcing sheets using a perforation cutting head or a laser, thereby producing respective first and second perforated layers, wherein each respective set of staggered discontinuous perforations defines a respective first plurality of reinforcing fibers having a respective first length and a respective second plurality of reinforcing fibers having a respective second length longer than the respective first length; and
stacking the core layer between the first and second perforated layers.

17. The method of claim 16, further comprising:
heating the stacked core layer and first and second perforated layers to achieve a predetermined degree of cure of the first and second perforated layers.

18. The method of claim 16, further comprising:
heating the polymer matrix to a predetermined temperature; and
mixing hollow microspheres into the polymer matrix.

19. A method according to claim 17, further comprising:
winding the stacked core layer and first and second perforated layers into a roll.

20. A method according to claim 16, further comprising:
dispersing the graphene nanoplatelet/polymer matrix mixture onto each of two second carrier films;
placing continuous fiber filaments or sheets onto or into the graphene nanoplatelet/polymer matrix mixture on each of the second carrier films, thereby defining the first and second layers, and to achieve a predetermined fiber volume fraction for each of the first and second layers; and heating the first and second layers to achieve a predetermined degree of cure and/or a predetermined viscosity for the graphene nanoplatelet/polymer matrix mixture portions of both the first and second layers.

\* \* \* \* \*